(12) United States Patent
Medlyn

(10) Patent No.: US 10,387,144 B2
(45) Date of Patent: Aug. 20, 2019

(54) METHOD AND SYSTEM FOR DETERMINING LOGGING STATEMENT CODE COVERAGE

(71) Applicant: Dayne Howard Medlyn, Windsor, CO (US)

(72) Inventor: Dayne Howard Medlyn, Windsor, CO (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/945,746

(22) Filed: Nov. 19, 2015

(65) Prior Publication Data

US 2017/0147336 A1    May 25, 2017

(51) Int. Cl.
   *G06F 8/77*      (2018.01)
   *G06F 8/73*      (2018.01)
   *G06F 11/36*     (2006.01)

(52) U.S. Cl.
   CPC .................. *G06F 8/73* (2013.01); *G06F 8/77* (2013.01); *G06F 11/3676* (2013.01)

(58) Field of Classification Search
   CPC ........... G06F 8/73; G06F 11/3676; G06F 8/77
   See application file for complete search history.

(56) References Cited

U.S. PATENT DOCUMENTS

| 2006/0294503 A1* | 12/2006 | Henderson .......... G06F 11/3604 717/131 |
| 2009/0144698 A1* | 6/2009 | Fanning .................... G06F 8/75 717/120 |
| 2013/0232473 A1* | 9/2013 | Braun ................. G06F 11/3676 717/129 |
| 2015/0371047 A1* | 12/2015 | Mendelev ............. G06F 21/563 726/25 |

* cited by examiner

*Primary Examiner* — Wei Y Zhen
*Assistant Examiner* — Amir Soltanzadeh
(74) *Attorney, Agent, or Firm* — Baker Botts L.L.P.

(57) ABSTRACT

A method for determining logging statement coverage of code. According to the inventive embodiments of this disclosure, a method is used for determining logging statement coverage of code, the method including the step of determining a plurality of code paths through the code file that may be traversed during execution of a program, identifying a plurality of branches in the code paths that do not contain a logging statement; and calculating, as a percentage of the plurality of code paths through the code file that may be traversed during execution of percentage code paths that have not been traversed the plurality of branches through the code file that do not contain a logging statement.

16 Claims, 3 Drawing Sheets

METHOD AND SYSTEM FOR DETERMINING LOGGING STATEMENT CODE COVERAGE

BACKGROUND

The present disclosure relates generally to method and system for determining logging statement code coverage. In order to ensure a software program functions as it was intended, software engineers will typically run a number of tests on the program before it is released to end-users. However, it is well recognized that the number of tests to account for every possibility in a program is practically infinite. In this situation, static analysis may be beneficial since static analysis will cover 100% of the code. "Static code analysis," is when software code is analyzed for bugs or programming errors without executing the software.

Once a program—or an updated version of the program—is operational, it can be released to certain groups of end-users, or even made available to the open public to increase the amount of feedback. This allows software engineers to continuously improve upon the program based on feedback from real end-users, for example, removing any bugs and glitches encountered by the end-users. Although developers may want to find as many bugs as possible, it is equally important not to overwhelm the developer with too much output. Static code analysis may also be useful in this situation because no actual code is being executed.

In order to obtain the feedback from end-users, a program may be released with logging statements that record information when the program is being used by a customer end-user, including information that identifies previously undetected bugs or glitches in the program. Removing or fixing bugs or glitches in the program depends on whether the portion of software code causing the problem can be pinpointed accurately and efficiently.

BRIEF SUMMARY

The present disclosure relates generally to methods and systems for determining logging statement code coverage. According to the inventive embodiments of the disclosure, a method is used for determining logging statement code coverage, where the method comprises of receiving a code file; determining a plurality of code paths through the code file that may be traversed during execution of a program; identifying a plurality of branches in the plurality of code paths through the code file that do not contain a logging statement; calculating, as a percentage of the plurality of code paths through the code file that may be traversed during execution of the program, the plurality of branches through the code file that do not contain a logging statement; and generating a display of said percentage and the plurality of branches through the code file that do not contain a logging statement.

According to another embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

Aspects of the present disclosure are illustrated by way of example and are not limited by the accompanying figures with like references indicating like elements. For a more complete understanding of the present disclosure, needs satisfied thereby, and the objects, features, and advantages thereof, reference now is made to the following description taken in connection with the accompanying drawings.

DETAILED DESCRIPTION

Figure 1:
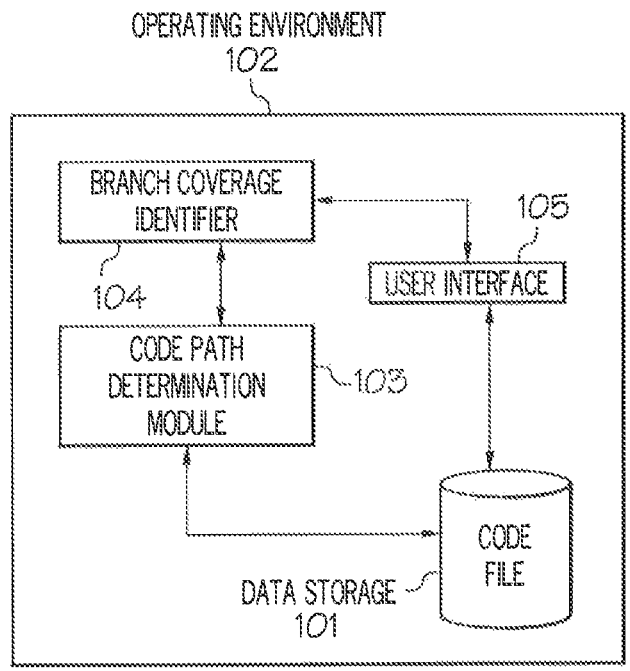
FIG. 1 illustrates depicting a system for determining logging statement code coverage according to a non-limiting embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Generally, logging statement code coverage testing and analysis allows developers to validate the functionality of their software programs and to find potential problems based on feedback from end-users. In order to obtain this feedback, a program may be released with logging statements that record information when the program is being used by an end-user, including information that identifies previously undetected bugs or glitches in the program.

Removing or fixing bugs or glitches in the program depends on whether the portion of software code causing the problem can be pinpointed accurately and efficiently. In this situation, the code paths in the program must have a sufficient number of logging statements to adequately identify whether a problem originated in one branch of the code path or another. Moreover, although developers may want to find as many bugs as possible, it is equally important not to overwhelm the developer with too much output. Static code analysis may also be useful in this situation because no actually code is being executed.

For example, if there are six branches in a portion of code and there are only log statements prior to the branching, or only one of the six branches, the logging statements can only indicate that the problem occurred in one of the branches but with no specific information as to which branch actually had the issue. More logging statement coverage allows software engineers to more effectively triage issues encountered in end-user environments. On the other hand, it may be redundant and inefficient to have a code path that contains statements for every single branch. Thus, it is important to understand whether a program has sufficient, but just enough log statement coverage, at a specific log level, to enable problems in the code to be adequately triaged.

Accordingly, there is a need for a system that allows a software engineer to determine logging statement coverage, at specific logging levels, that is adequate to identify potential problems in the code of a program. In the present disclosure, a system first determines a plurality of code paths through the code file that may be traversed during execution of a program, then identifies branches in the plurality of code paths through the code file that do not contain a logging statement. Based on the plurality of code paths and branches in the code paths that do not contain a logging statement, the system calculates the percentage of code paths without logging statements and displays a visualization of the percentage and a visualization of the plurality of code paths. Based on this visualization, the software engineer can identify branches that lack sufficient logging statement coverage.

With reference to FIG. 1, a system for determining logging statement code coverage is illustrated in accordance with a non-limiting embodiment of the present disclosure. The system for determining logging statement code coverage may include a Data Store 101 and an Operating Environment 102. Data Store 101 and Operating Environment 102 may be devices, such as computers, servers, switches, routers, and the like, that store and execute functions. Determining logging statement code coverage may take place within the Operating Environment 102, which may include one or more processors for running computer software and hardware. Code Path Determination Module 103 may be considered a processor in the Operating Environment 102, operable to analyze a code file stored in Data Store 101. Branch Coverage Identifier 104 may also be considered a processor in the Operating Environment 102, operable to identify a plurality of branches in the plurality of code paths through the code file that do not contain a logging statement. Code Path Determination Module 103, Branch Coverage Identifier 104, Data Store 101 and User Interface 105, may be configured to transmit and receive information from one another. User Interface 105 allows the user to interface with the Operating Environment 102. The User Interface 105 may direct the system to perform various tasks, such as receiving a code file, analyzing a code file to determine logging statement code coverage, compiling source code into object code, executing object code, and also generate a display or map of the percentage and branches through the code file that do not contain a logging statement.

Figure 2:
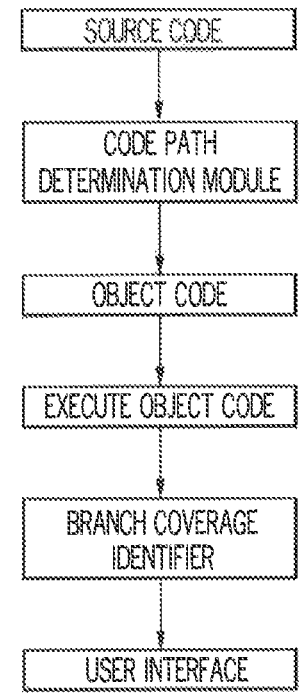
FIG. 2 illustrates a flow chart depicting a method for determining logging statement code coverage according to a non-limiting embodiment of the disclosure.

FIG. 2 illustrates a flow chart depicting a method for determining logging statement code coverage according to a non-limiting embodiment of the disclosure. An uncompiled code file, i.e., source code, is first sent to the Operating Environment 102, where Code Path Determination Module 103 determines the code paths in the code file that may be traversed during execution of the program (in object code), and sends the results to User Interface 105. In another non-limiting embodiment of the disclosure, Code Path Determination Module 103 compiles the source code in the code file to object code, whereupon it can be executed, or simply stores.

Figure 3:
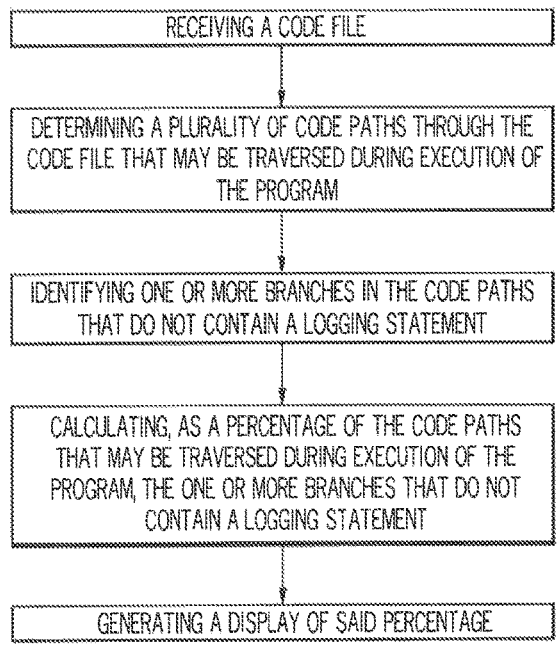
FIG. 3 illustrates a flow chart depicting a method for determining logging statement code coverage with a subroutine according to a non-limiting embodiment of the disclosure.
Figure 4:
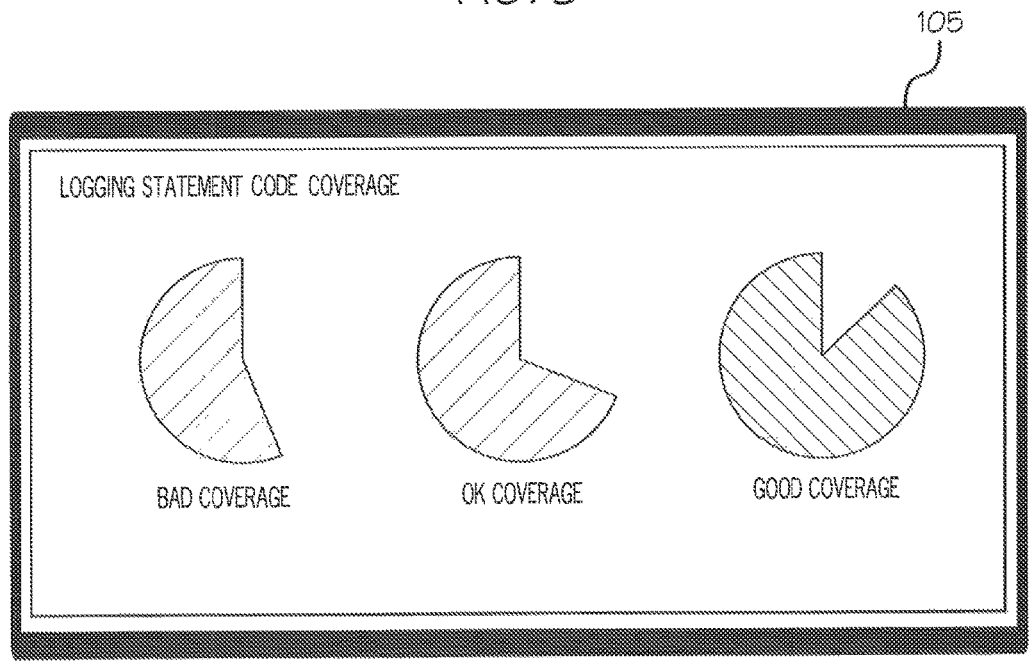
FIG. 4 illustrates a visual display that displays logging statement code coverage according to a non-limiting embodiment of the disclosure.

As illustrated in the flow chart of FIG. 3, Branch Coverage Identifier 104 identifies the branches of code that do not contain a logging statement and calculates, as a percentage of the code paths that may be traversed during execution of the program, the branches that do not contain a logging statement. This information is then sent to displays by the User Interface 105. FIG. 4 illustrates an example of a non-limiting embodiment of the User Interface that displays the percentage of the branches that do not contain a logging statement with respect to the total number of code paths that may be traversed during execution of the program.

When there are branches that do not contain a logging statement, Branch Coverage Identifier 104 may identify the number of branches that lack sufficient logging statements to adequately identify whether an experienced problem originated in one branch or the other. Determining whether a branch lacks sufficient logging statements to adequately identify whether an experienced problem originated in one branch or the other is measured in several ways. For example, users can set and define thresholds for what constitutes good, fair, or poor logging statement coverage. If the Code Path Determination Module 103 compiled source code and executed the program, Branch Coverage Identifier 104 may also be used to identify functions that have executed, functions that have not executed, branches not covered or not covered by a logging statement, percentage of code paths covered, percentage of code paths not covered, and so forth.

Figure 5:
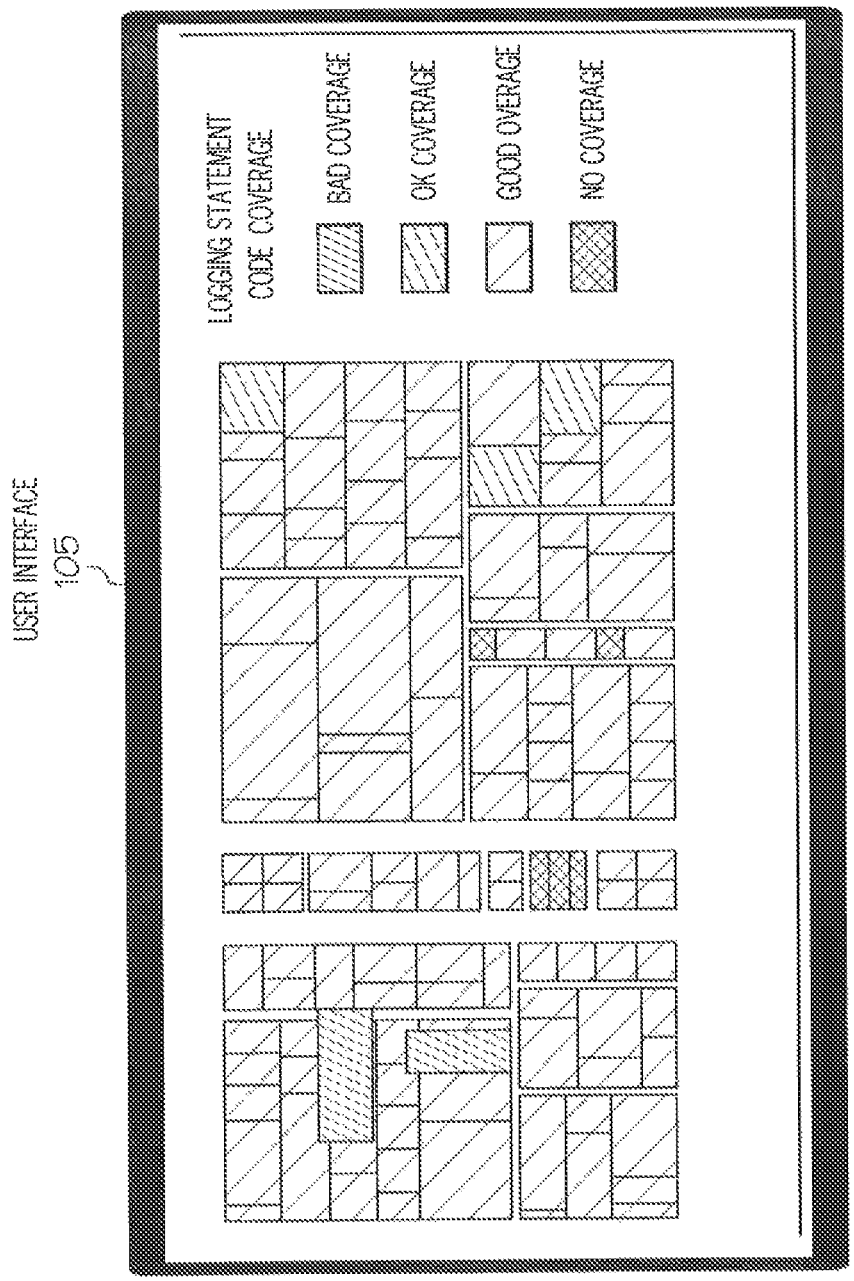
FIG. 5 illustrates a visual display of a logging statement code coverage map in accordance with a non-limiting embodiment of the present disclosure limiting embodiment of the disclosure.

FIG. 5 illustrates an example of a non-limiting embodiment of the User Interface 105 that displays a visualization of code paths that do not contain a logging statement. This visualization may be configured to show different user-defined thresholds for logging statement coverage. The present disclosure can be used on or with programs having any number of code paths, logging statements, and thresholds for determining whether logging statement code coverage is adequate. The User Interface 105 may display such information on a map, allowing a developer to track code paths that may be traversed during execution of the program.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method for determining logging statement code coverage, the method comprising:
   receiving a code file;
   determining a plurality of code paths through the code file that may be traversed during execution of a program;
   identifying a plurality of branches in the plurality of code paths through the code file that do not contain logging statement code coverage;
   calculating, as a percentage of the plurality of code paths through the code file that may be traversed during execution of the program, the percentage of the plurality of branches through the code file that do not contain logging statement code coverage; and automatically inserting new logging statement code coverage into code paths that do not contain logging statement code coverage when the percentage of the plurality of code paths through the code file that may be traversed during execution of the program is below a pre-determined threshold.

2. The method according to claim 1, wherein the display is a map of the plurality of code paths that may be traversed during execution of the program.

3. The method according to claim 2, further comprising:
highlighting on said display the plurality of branches in the plurality of code paths through the code file that do not contain logging statement code coverage.

4. The method according to claim 2, wherein the map of the code paths comprises a visualization of the portion of the source code corresponding to each one of the plurality of branches that do not contain logging statement code coverage, said visualization configured to update in real-time if the program is executed.

5. The method according to claim 1, further comprising:
determining whether the percentage of the plurality of branches through the code file that do not contain logging statement code coverage meets a user-determined threshold.

6. The method according to claim 1, further comprising:
generating, for display at a graphical user interface, a display of said percentage of the plurality of branches through the code file that do not contain logging statement code coverage.

7. The method according to claim 1, further comprising:
identifying a portion of the code that corresponds to a function that may be executed prior to one of the plurality of branches that do not contain logging statement code coverage.

8. A system for determining logging statement code coverage, the system comprising:
a processor; and
a memory that stores logic operable to:
receive a code file which contains source code;
determine a plurality of code paths through the code file that may be traversed during execution of a program;
identify a plurality of branches in the plurality of code paths through the code file that do not contain logging statement code coverage;
calculate, as a percentage of the plurality of code paths through the code file that may be traversed during execution of the program, the percentage of the plurality of branches through the code file that do not contain logging statement code coverage; and
automatically inserting logging statement code coverage into code paths that do not contain a logging statement code coverage when the percentage of the plurality of code paths through the code file that may be traversed during execution of the program is below a pre-determined threshold.

9. The system according to claim 8, wherein the display is a map of the plurality of code paths that may be traversed during execution of the program.

10. The system according to claim 8, the logic further operable to:
highlighting on said display the plurality of branches in the plurality of code paths through the code file that do not contain logging statement code coverage.

11. The system according to claim 8, wherein the map of the code paths comprises a visualization of the portion of the source code corresponding to each one of the plurality of branches that do not contain logging statement code coverage, said visualization configured to update in real-time if the program is executed.

12. The system according to claim 8, the logic further operable to:
determining whether the percentage of the plurality of code paths through the code file that may be traversed during execution of the program meets a user-determined threshold.

13. The system according to claim 8, the logic further operable to:
generate a display of said percentage of the plurality of branches through the code file that do not contain logging statement code coverage.

14. The system according to claim 8, the logic further operable to:
identifying a portion of the code that corresponds to a function that may be executed prior to one of the plurality of branches that do not contain logging statement code coverage.

15. A computer program product comprising:
a non-transitory computer readable storage medium having computer readable program code embodied therewith, the computer readable program code comprising:
computer readable program code configured to receive a code file;
computer readable program code configured to determine a plurality of code paths through the code file that may be traversed during execution of a program;
computer readable program code configured to identify a plurality of branches in the plurality of code paths through the code file that do not contain logging statement code coverage;
computer readable program code configured to calculate, as a percentage of the plurality of code paths through the code file that may be traversed during execution of the program, the percentage of the plurality of branches through the code file that do not contain logging statement code coverage; and
computer readable program code configured to automatically insert logging statement code coverage into code paths that do not contain a logging statement code coverage when the percentage of the plurality of code paths through the code file that may be traversed during execution of the program is below a pre-determined threshold.

16. A computer program product comprising:
computer readable program code configured to generate a display of said percentage of the plurality of branches through the code file that do not contain logging statement code coverage.

* * * * *